(12) United States Patent
Deskur et al.

(10) Patent No.: US 12,043,584 B2
(45) Date of Patent: Jul. 23, 2024

(54) METHOD AND SYSTEM FOR TREATING A CALCIUM-BASED STONE FOR CORROSION AND STAIN RESISTANCE

(71) Applicant: MORE Surface Care, LLC, Hayward, CA (US)

(72) Inventors: Mark Deskur, McDougall (CA); Steven Wolf, Palo Alto, CA (US)

(73) Assignee: MORE SURFACE CARE, LLC, Hayward, CA (US)

( * ) Notice: Subject to any disclaimer, the term of this patent is extended or adjusted under 35 U.S.C. 154(b) by 54 days.

(21) Appl. No.: 17/844,291

(22) Filed: Jun. 20, 2022

(65) Prior Publication Data
US 2022/0411341 A1 Dec. 29, 2022

Related U.S. Application Data

(60) Provisional application No. 63/202,791, filed on Jun. 24, 2021.

(51) Int. Cl.
C04B 41/45 (2006.01)
C04B 41/48 (2006.01)
C04B 41/53 (2006.01)

(52) U.S. Cl.
CPC ........ *C04B 41/4543* (2013.01); *C04B 41/483* (2013.01); *C04B 41/53* (2013.01)

(58) Field of Classification Search
None
See application file for complete search history.

(56) References Cited

U.S. PATENT DOCUMENTS

| | | | | |
|---|---|---|---|---|
| 5,597,627 A | * | 1/1997 | Lindeberg | B28D 1/003 264/102 |
| 6,740,417 B1 | * | 5/2004 | Sievers | B28D 1/221 125/1 |

(Continued)

FOREIGN PATENT DOCUMENTS

| | | |
|---|---|---|
| CN | 104212396 A | 12/2014 |
| KR | 102205517 B1 | 1/2021 |

(Continued)

OTHER PUBLICATIONS

K. Kirk, "The Definitive Guide to Quartzite," Website: Use Natural Stone, Jan. 24, 2017, retrieved from https://usenaturalstone.org/definitive-guide-quartzite/ on Oct. 10, 2023. (Year: 2017).*

(Continued)

*Primary Examiner* — Charles Capozzi
(74) *Attorney, Agent, or Firm* — Vivacqua Crane, PLLC

(57) ABSTRACT

A method and system for treating calcium-based stone having a surface to be treated for corrosion and stain resistance is provided. The system comprises a sanding unit to sand the surface of the calcium-based stone with a grit size of 40 to 100 to promote coating adhesion. The system further comprises a coating unit to coat the surface of the calcium-based stone with a predetermined amount of a coating material for corrosion and stain resistance defining an uncured coating on the surface. The system further comprises a curing unit to cure the uncured coating on the surface with a photo-initiator defining a cured coating on the surface. The system further comprises a polishing unit to polish the cured coating on the surface with a grit size of 1000 to 3000. The system further comprises a buffing unit to buff the cured coating on the surface with a fabric defining a treated surface of the calcium-based stone.

9 Claims, 2 Drawing Sheets

(56) References Cited

U.S. PATENT DOCUMENTS

| | | | |
|---|---|---|---|
| 2010/0068401 A1 | 3/2010 | Batoz et al. | |
| 2012/0196087 A1* | 8/2012 | Albalak | C04B 41/48 427/508 |
| 2015/0328921 A1* | 11/2015 | Le Duff | B29C 37/0032 428/142 |

FOREIGN PATENT DOCUMENTS

| | | | |
|---|---|---|---|
| WO | 0136762 A1 | 5/2001 | |
| WO | 2014179128 A1 | 11/2014 | |

OTHER PUBLICATIONS

International Searching Authority. International Search Report and Written Opinion for PCT Application No. PCT/US2022/34151and mailed Sep. 19, 2023, pp. 1-50.

* cited by examiner

METHOD AND SYSTEM FOR TREATING A CALCIUM-BASED STONE FOR CORROSION AND STAIN RESISTANCE

CROSS-REFERENCE TO RELATED APPLICATIONS

The present application claims priority of provisional application 63/202,791, filed on Jun. 24, 2021. The contents of the application are incorporated herein by reference in its entirety.

INTRODUCTION

The present disclosure relates to treating calcium-based stones and, more particularly, systems and method for treating calcium-based stones for corrosion and stain resistance.

Acid-sensitive stones such as marble, limestone, travertine, and onyx are prone to etching. When acidic substances come in contact with such stones, acid may begin to dissolve the calcium content of the surface leaving voids, resulting in dull, rough to the touch, spots known as "etching." An etch may not be a stain and may not be prevented by using most of the penetrating stone sealers.

Existing coating systems are applied on-site to isolate surfaces of stones from staining liquids and acidic substances. However, methods and systems of coating can be improved. For example, existing coatings do not preserve the natural look of the stone, do not adhere to the surfaces of the stone, lack the ability to resist staining materials and contamination, and take a relatively long time to cure, thereby keeping an on-site space undesirably "out of service." That is, existing coating method and systems are applied on-site and require a relatively long period of time to cure, thereby keeping the on-site space undesirably out of service.

SUMMARY

Thus, while current methods of treating calcium-based stones achieve their intended purpose, there is a need for a new and improved system and method for treating calcium-based stones for corrosion and stain resistance.

According to several aspects, the present disclosure provides a method and system for treating a calcium-based stone having a surface to be treated for corrosion and stain resistance.

In one aspect the present disclosure comprises a method for treating a calcium-based stone having a surface to be treated for corrosion and stain resistance. The method comprises sanding the surface of the calcium-based stone with a grit size of 40 to 100 to promote coating adhesion. In this aspect, the method further comprises coating the surface of the calcium-based stone with a predetermined amount of a coating material for corrosion and stain resistance to define an uncured coating on the surface. The method further comprises curing the uncured coating on the surface with a photo-initiator defining a cured coating on the surface. In this aspect, the method further comprises polishing the cured coating on the surface with a grit size of 1000 to 3000; and buffing the cured coating on the surface with a fabric defining a treated surface of the calcium-based stone.

In one example of this aspect of the present disclosure, the method further comprises loading the calcium-based stone to an infeed prior to the step of sanding. After sanding, the method comprises cleaning the surface of the calcium-based stone to remove dust and debris prior to coating. In this example, the method comprises settling the uncured coating on the surface for 8 to 20 minutes at 20° C. to 100° C. to level the uncured coating on the surface.

In another example, the step of sanding includes a grit size of 80. In yet example, the predetermined amount of the coating material is 10 to 30 mL per square foot.

In yet another example, the coating material comprises an acrylic resin, a photoinitiator blend, and an additive.

In still another example, the photo-initiator is one of an ultraviolet and a light-emitting diode device. In yet another example, the step of polishing includes a grit size of 1200 to 3000. In another example, the step of polishing includes a grit size of 1500 to 3000.

In another example of this aspect, the step of coating the surface of the calcium-based stone comprises spraying the coating material on the surface. In yet another example, the step of settling comprises settling the uncured coating on the surface for 15 minutes at 60° C.

In another aspect of the present disclosure, a system for treating calcium-based stone having a surface to be treated for corrosion and stain resistance is provided. The system comprises a sanding unit to sand the surface of the calcium-based stone with a grit size of 40 to 100 to promote coating adhesion. The system further comprises a coating unit to coat the surface of the calcium-based stone with a predetermined amount of a coating material for corrosion and stain resistance defining an uncured coating on the surface. The system further comprises a curing unit to cure the uncured coating on the surface with a photo-initiator defining a cured coating on the surface. The system further comprises a polishing unit to polish the cured coating on the surface with a grit size of 1000 to 3000 and a buffing unit to buff the cured coating on the surface with a fabric defining a treated surface of the calcium-based stone.

In an embodiment of this aspect of the present disclosure, the system comprises a cleaning unit to clean the surface of the calcium-based stone for removing dust and debris after sanding the surface. In this embodiment, the system further comprises a holding unit to settle the uncured coating on the surface for 8 to 20 minutes at 20° C. to 100° C. for leveling the uncured coating on the surface.

In another embodiment of this aspect, the sanding unit includes a grit size of 80. In yet another embodiment, the predetermined amount of the coating material is 10 to 30 mL per square foot.

In still another embodiment, the coating material is an acrylic resin, a photoinitiator blend, and an additive.

In another embodiment of this aspect, the photo-initiator is one of an ultraviolet and a light-emitting diode device. In yet another embodiment, the polishing unit includes a grit size of 1200 to 3000.

In yet another embodiment of this aspect, the system further comprises a belt conveyor apparatus having an infeed portion and a carrying medium upon which the calcium-based stone is loaded at the infeed portion upstream of the sanding unit. In this embodiment, the carrying medium is movable and in transit communication with each of the sanding unit, the coating unit, the curing unit, the polishing unit, and the buffing unit such that the calcium-based stone is movable therethrough.

In still another embodiment, the coating unit comprises a spraying device for spraying the coating material on the surface.

In another aspect of the present disclosure, a method of treating calcium-based stone having a surface to be treated for corrosion and stain resistance is provided. The method comprises loading the calcium-based stone to an infeed prior to the step of sanding and sanding the surface of the calcium-based stone with a grit size of 40 to 100 to promote coating adhesion. After sanding, the method comprises cleaning the surface of the calcium-based stone to remove dust and debris prior to coating.

In this example, the method further comprises coating the surface of the calcium-based stone with a predetermined amount of a coating material for corrosion and stain resistance to define an uncured coating on the surface and settling the uncured coating on the surface for 8 to 20 minutes at 20° C. to 100° C. to level the uncured coating on the surface. The method further comprises curing the uncured coating on the surface with a photoinitiator defining a cured coating on the surface. In this example, the method further comprises polishing the cured coating on the surface with a grit size of 1000 to 3000 and buffing the cured coating on the surface with a fabric to polish the cured coating defining a treated surface of the calcium-based stone.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides methods and systems for treating calcium-based stones having a surface to be treated for corrosion and stain resistance. The methods and systems allow for preservation of a natural look of the stones, facilitate coating adherence to the surfaces of the stones, allow coating resistance to stains, facilitate resistance to contamination by debris, and avoid undesirably out of service status of a site at which the stones are installed.

Figure 1A:
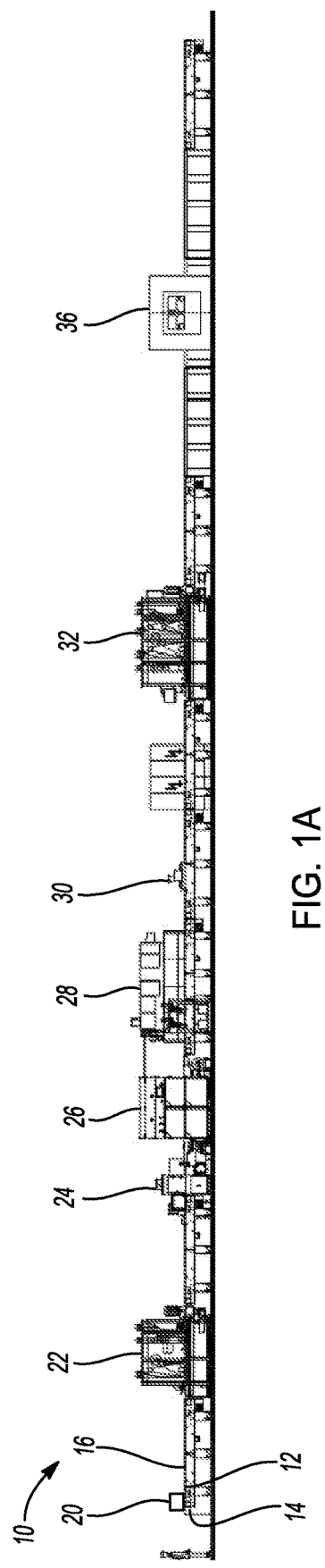
FIG. 1A is a schematic side view of a system for treating a calcium-based stone for corrosion and stain resistance in accordance with one embodiment of the present disclosure.
Figure 1B:
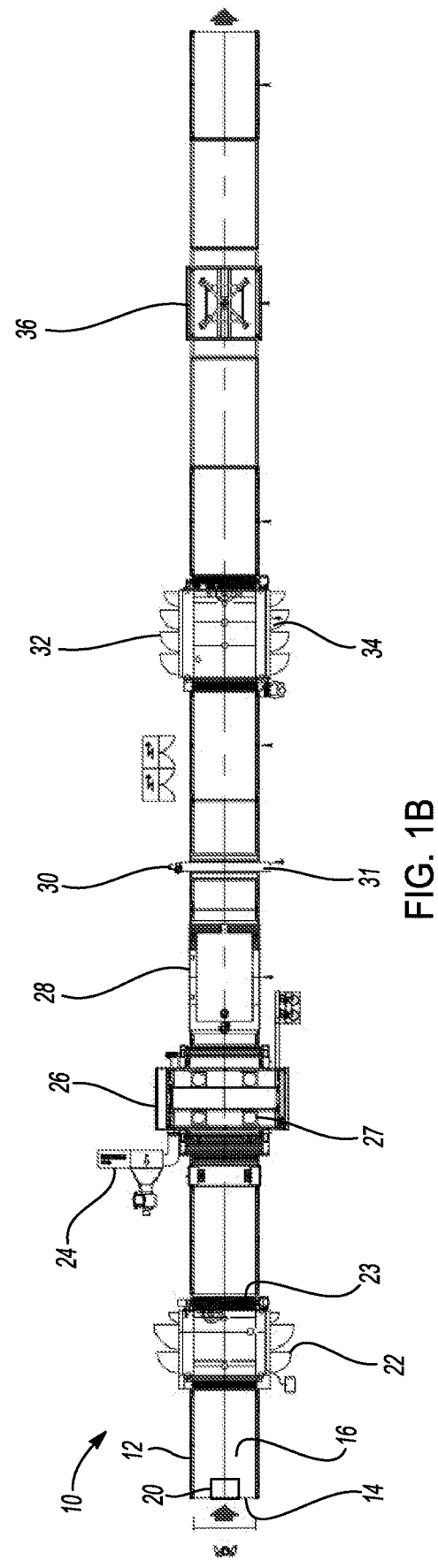
FIG. 1B is a schematic plan view of the system of FIG. 1A.

In accordance with one embodiment of the present disclosure, FIGS. 1A and 1B illustrate a system 10 for treating a calcium-based stone having a surface to be treated for corrosion and stain resistance. The surface of the calcium-bases stone may be any surface thereof. As shown, the system 10 is operated by way of a belt conveyor apparatus 12 having an infeed 14 and a carrying medium 16, such as a conveyor belt, upon which the calcium-based stone is loaded. Stone (e.g. marble) workpieces of different sizes and shapes are manually loaded onto the infeed 14, defining a workgroup charge or slab 20. In this embodiment, the calcium-based stones or workgroup charge 20 is first loaded onto the carrying medium 16 at the infeed 14. In this embodiment, the carrying medium 16 is movable and in transit communication with each unit described below such that the workgroup charge 20 is movable through the system 10.

As shown in FIGS. 1A and 1B, the system 10 comprises a sanding unit 22 arranged to sand the surfaces of the calcium-based stones, thereby preparing the surfaces for coating. In one example, the surfaces are scuffed to promote adhesion of a coating material (discussed below) onto the surfaces. In this embodiment, the sanding unit 10 comprises a crossbelt apparatus 23 having a sanding material with a grit size of 40 to 100, preferably 80 grit, to promote coating adhesion. As the charge 20 is loaded onto the infeed 14 upstream of the sanding unit 22, the conveyor belt moves the charge 20 to the sanding unit 22 to sand the surfaces of the calcium-based stones.

As depicted in FIGS. 1A and 1B, the system 10 comprises a cleaning unit 24 arranged to clean the surfaces of the calcium-based stones for removing dust and debris after sanding the surface. The cleaning unit 24 may be comprised of a combination of suction devices, blowing mechanisms, and sweeping apparatus to remove dust and debris from the surfaces or airborne. It is to be understood that any suitable suction device, blowing mechanism and sweeping apparatus may be used without departing from the spirit or scope of the present disclosure.

As depicted in FIGS. 1A and 1B, the system 10 further comprises a coating unit 26 arranged to coat the surface of the calcium-based stone with a predetermined amount of an ultraviolet curable coating material for corrosion and stain resistance defining an uncured coating on the surface. The coating material may comprise an acrylic resin, a photoinitiator blend, and an additive.

In one example, the coating unit 26 may comprise a spraying apparatus 27 for spraying the coating material on the surface. For example, the spraying apparatus 27 may be a spray machine wherein surfaces are sprayed with four spray guns. In this example, the spray machine is configured to coat a top surface and side surfaces of each calcium-based stone. However, it is to be understood that any coating or spraying mechanism may be used to coat the surfaces of the calcium-based stones without departing from the spirit or scope of the present disclosure. Moreover, the predetermined amount of the coating material is 10 to 30 mL per square foot, preferably 25 mL per square foot. As a result, the uncured coating on the surfaces may be 4 to 10 mil, preferably 7 mil (0.007 inch), in thickness.

After the coating unit 26, the workgroup charge 20 is moved to a leveling or holding unit 28 arranged to allow the uncured coating to settle on the surfaces of the calcium-based stones. At the leveling unit 28, the coating is allowed to settle on the surfaces of the calcium-based stones and superficially absorb into pores of the stones for 8 to 20 minutes (dwell time) at 20° C. to 100° C., thereby leveling the uncured coating on the surfaces of the stones. Preferably, the coating is allowed to settle on the surfaces and superficially absorb into the pores of the stones for 15 minutes at 60° C.

As shown in FIGS. 1A and 1B, the system 10 further comprises a curing unit 30 arranged to cure the uncured coating on the surfaces of the calcium-based stones with a photoinitiator defining a cured coating on the surface. In one example, the curing unit 30 comprises an ultraviolet curing oven 31. At the curing unit 30, the workgroup charge 20 passes (e.g. 1 meter per minute) through the ultraviolet curing oven 31 where the uncured coating on surfaces of the calcium-based stone are cured, defining the cured coating. Moreover, it is to be understood that the photoinitiator may be any suitable photoinitiator such as ultraviolet or light-emitting diode device without departing from the scope or spirit of the present disclosure.

After the curing unit 30, the workgroup charge is moved to a polishing unit 32 as depicted in FIGS. 1A and 1B. The polishing unit 32 is arranged to polish the cured coating on the surfaces of the calcium-based stones. The polishing unit 32 comprises a polishing apparatus 34 with grit size of 1000 to 3000, preferably 1200 to 3000, and more preferably 1500 to 3000. In one example, the polishing unit 32 comprises a crossbelt sanding mechanism having three grit levels (e.g., 1000, 1200, and 1500) and polishes the surfaces of the calcium-based stones.

As shown in FIGS. 1A and 1B, the system 10 further comprises a buffing unit 36 arranged to buff the cured coating on the surfaces of the calcium-based stones to define treated surfaces of the calcium-based stones. In one example, the buffing unit 36 includes an apparatus that uses a fabric to buff the surfaces of the calcium-based stones.

Figure 2:
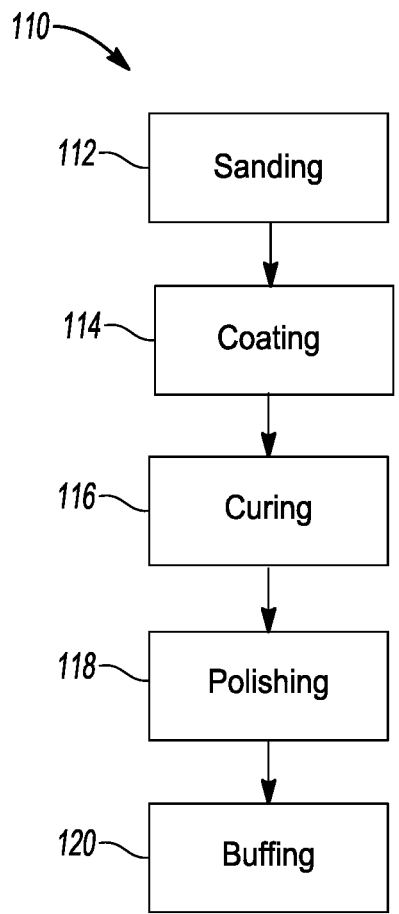
FIG. 2 is a flowchart of a method of treating a calcium-based stone for corrosion and stain resistance implemented by the system of FIG. 1.

In accordance with another example of the present disclosure, FIG. 2 depicts a flowchart of a method 110 for treating a calcium-based stone having a surface to be treated for corrosion and stain resistance. The method is to be conducted an off-site (away from a stone installation site) location. Preferably, the method 110 is implemented by the system 10 of FIGS. 1A and 1B. As discussed above, stone (e.g. marble) workpieces of different sizes and shapes are manually loaded onto the infeed, defining a workgroup charge or slab.

As shown, the method comprises in box 112 a step of sanding the surfaces of the calcium-based stone, thereby preparing the surfaces for coating. In one example, the surfaces are scuffed to promote adhesion of a coating material onto the surfaces. In this embodiment, the step of sanding may be achieved with a crossbelt apparatus having a sanding material with a grit size of 40 to 100, preferably 80 grit, to promote coating adhesion.

In this aspect, the method further comprises in box 114 coating the surface of the calcium-based stone with a predetermined amount of an ultraviolet curable coating material for corrosion and stain resistance defining an uncured coating on the surface. The coating material may comprise an acrylic resin, a photoinitiator blend, and an additive.

In one example, the step of coating comprises implementing a spraying apparatus for spraying the coating material on the surface. For example, the spraying apparatus may be a spray machine wherein surfaces are sprayed with four spray guns. In this example, the spray machine is configured to coat a top surface and four side surfaces of each calcium-based stone. However, it is to be understood that any coating or spraying mechanism may be used to coat the surfaces of the calcium-based stones without departing from the spirit or scope of the present disclosure. Moreover, the predetermined amount of the coating material is 10 to 30 mL per square foot, preferably 25 mL per square foot. As a result, the uncured coating on the surfaces may be 4 to 10 mil, preferably 7 mil (0.007 inch), in thickness.

The method further comprises in box 116 curing the uncured coating on the surfaces of the calcium-based stones with a photoinitiator defining a cured coating on the surface. In one example, the step of curing comprises implementing a curing unit that comprises an ultraviolet curing oven. In this example, the workgroup charge passes (e.g. 1 meter per minute) through the ultraviolet curing oven where the uncured coating on surfaces of the calcium-based stone are cured, defining the cured coating. Moreover, it is to be understood that the photoinitiator may be any suitable photoinitiator such as ultraviolet or light-emitting diode device without departing from the scope or spirit of the present disclosure.

After the step of curing, the method further comprises in box 118 polishing the cured coating on the surfaces of the calcium-based stones. The polishing unit comprises a polishing apparatus with grit size of 1000 to 3000. Preferably the grit size is 1200 to 3000, and more preferably 1500 to 3000. In this example, the step of polishing implements a polishing unit comprising a crossbelt sanding mechanism having three grit levels (e.g., 1000, 1200, and 1500) and polishes the surfaces of the calcium-based stones.

As shown, the method further comprises in box 120 a step of buffing the cured coating on the surfaces of the calcium-based stones to define treated surfaces of the calcium-based stones. In this example, the step of buffing implements a buffing unit comprising an apparatus that uses a fabric to buff the surfaces of the calcium-based stones.

Figure 3:
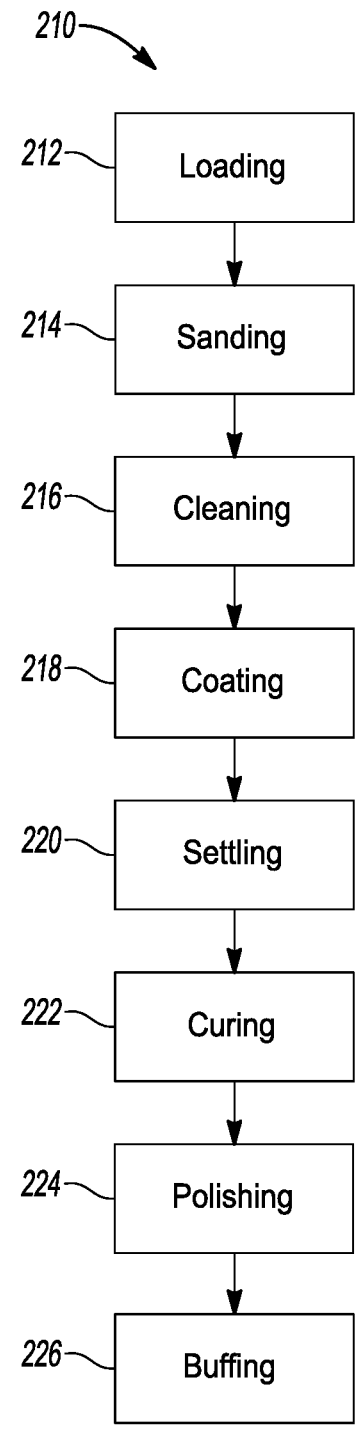
FIG. 3 is a flowchart of another method of treating a calcium-based stone for corrosion and stain resistance implemented by the system of FIG. 1.

In another aspect of the present disclosure, a method 210 of treating calcium-based stone having a surface to be treated for corrosion and stain resistance is provided in FIG. 3. The method is to be conducted an off-site (away from a stone installation site) location. Moreover, it is to be understood that the method of FIG. 3 may be implemented by the system 10 of FIGS. 1A and 1B discussed above. As shown, the method comprises in box 212 loading the calcium-based stone to an infeed and in box 214 sanding the surface of the calcium-based stone with a grit size of 40 to 100 to promote coating adhesion. After sanding, the method comprises in box 216 cleaning the surface of the calcium-based stone to remove dust and debris prior to coating.

As shown in FIG. 3, the method further comprises in box 218 coating the surface of the calcium-based stone with a predetermined amount of a coating material for corrosion and stain resistance to define an uncured coating on the surface. In this example, the method further comprises in box 220 settling the uncured coating on the surface for 8 to 20 minutes at 20° C. to 100° C. to level the uncured coating on the surface. As shown, the method further comprises in box 222 curing the uncured coating on the surface with a photoinitiator defining a cured coating on the surface.

In this example, the method further comprises in box 224 polishing the cured coating on the surface with a grit size of 1000 to 3000. Furthermore, the method further comprises in box 226 buffing the cured coating on the surface with a fabric to polish the cured coating defining a treated surface of the calcium-based stone.

As a result, surface coating productivity may be 200 square feet per hour or more without requiring any out of service time from the installation site. Thus, site preparation is eliminated and avoided. Moreover, on-site exposure to chemicals from the step of coating or debris from the step of sanding is avoided as well.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for treating calcium-based stone having a surface to be treated for corrosion and stain resistance, the system comprising:

a sanding unit configured to sand the surface of the calcium-based stone with a grit size of 40 to 100 to promote coating adhesion;

a coating unit configured to coat the surface of the calcium-based stone with a predetermined amount of a coating material for corrosion and stain resistance defining an uncured coating on the surface;

a curing unit configured to cure the uncured coating on the surface with a photo-initiator defining a cured coating on the surface;

a polishing unit configured to polish the cured coating on the surface with a grit size of 1000 to 3000; and a buffing unit configured to buff the cured coating on the surface with a fabric defining a treated surface of the calcium-based stone.

2. The system of claim 1 further comprising:

a cleaning unit configured to clean the surface of the calcium-based stone for removing dust and debris after sanding the surface; and a holding unit configured to settle the uncured coating on the surface for 8 to 20 minutes at 20° C. to 100° C. for leveling the uncured coating on the surface.

3. The system of claim 1 wherein the sanding unit includes a grit size of 80.

4. The system of claim 1 wherein the predetermined amount of the coating material is 10 to 30 mL per square foot.

5. The system of claim 1 wherein the coating material is an acrylic resin, a photoinitiator blend, and an additive.

6. The system of claim 1 wherein the photo-initiator is one of an ultraviolet and a light-emitting diode device.

7. The system of claim 1 wherein the polishing unit includes a grit size of 1200 to 3000.

8. The system of claim 1 further comprising a belt conveyor apparatus having an infeed portion and a carrying medium upon which the calcium-based stone is loaded at the infeed portion upstream of the sanding unit, the carrying medium being movable and in transit communication with each of the sanding unit, the coating unit, the curing unit, the polishing unit, and the buffing unit such that the calcium-based stone is movable therethrough.

9. The system of claim 1 wherein the coating unit comprises a spraying device for spraying the coating material on the surface.

* * * * *